(12) United States Patent
Santoso et al.

(10) Patent No.: US 7,934,487 B2
(45) Date of Patent: May 3, 2011

(54) FUEL CONTROL STRATEGY FOR HEATING A CATALYST

(75) Inventors: Halim G. Santoso, Novi, MI (US);
Eugene V. Gonze, Pinckney, MI (US);
Bryan Nathaniel Roos, Novi, MI (US);
Brian Spohn, Holly, MI (US)

(73) Assignee: GM Global Technology Operations LLC

( * ) Notice: Subject to any disclaimer, the term of this patent is extended or adjusted under 35 U.S.C. 154(b) by 2 days.

(21) Appl. No.: 12/481,957

(22) Filed: Jun. 10, 2009

(65) Prior Publication Data
US 2010/0318281 A1   Dec. 16, 2010

(51) Int. Cl.
*F02M 7/28* (2006.01)
(52) U.S. Cl. .......................... 123/435; 123/676
(58) Field of Classification Search .................. 123/676, 123/691, 692, 443, 685, 686, 435; 701/103–105, 701/109; 60/285, 286
See application file for complete search history.

(56) References Cited

U.S. PATENT DOCUMENTS

| | | | |
|---|---|---|---|
| 6,122,910 A * | 9/2000 | Hoshi et al. | 60/297 |
| 6,151,890 A * | 11/2000 | Hoshi | 60/297 |
| 6,189,316 B1 * | 2/2001 | Surnilla et al. | 60/274 |
| 6,244,043 B1 * | 6/2001 | Farmer et al. | 60/274 |
| 6,324,835 B1 * | 12/2001 | Surnilla et al. | 60/274 |
| 6,543,219 B1 * | 4/2003 | Surnilla | 60/285 |
| 6,557,505 B1 * | 5/2003 | Hori | 123/90.11 |
| 6,651,422 B1 * | 11/2003 | LeGare | 60/277 |
| 6,735,937 B2 * | 5/2004 | Sumilla et al. | 60/274 |
| 6,799,421 B2 * | 10/2004 | Surnilla | 60/285 |
| 7,363,915 B2 * | 4/2008 | Surnilla et al. | 123/481 |
| 7,707,821 B1 * | 5/2010 | Legare | 60/277 |
| 2007/0186876 A1 * | 8/2007 | Elwart et al. | 123/2 |

* cited by examiner

*Primary Examiner* — Hai H Huynh

(57) ABSTRACT

A control system for an engine having N cylinders in first and second banks includes a catalyst heat module and a fuel control module. N is an integer greater than two. The catalyst heat module selectively operates the engine in a catalyst heat mode to heat a catalyst. The fuel control module, throughout a fuel injection sequence for each of the N cylinders, adjusts a first air/fuel (A/F) ratio for the first bank to a rich value and adjusts a second A/F ratio for the second bank to a lean value.

20 Claims, 3 Drawing Sheets

US 7,934,487 B2

FUEL CONTROL STRATEGY FOR HEATING A CATALYST

FIELD

The present disclosure relates to fuel control systems and methods for heating catalysts in exhaust systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to generate drive torque for a vehicle. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, compression provided by a piston and/or spark provided by a spark plug. Combustion of the air/fuel mixture produces exhaust gas. The exhaust gas is expelled from the cylinders to an exhaust system.

The exhaust system includes a catalyst, such as a three-way catalyst, that reacts with the exhaust gas to reduce emissions. "Three-way" refers to the three emissions that a catalytic converter reduces, including carbon monoxide (CO), unburned hydrocarbons (HCs) and nitrogen oxide ($NO_x$). The catalyst, however, may be unable to react when the temperature of the catalyst is less than a light-off temperature. Accordingly, the catalyst's reaction capability may be limited upon engine startup (e.g., key ON) when the catalyst temperature is less than the light-off temperature.

An engine control module (ECM) controls the torque output of the engine. For example only, the ECM controls the torque output of the engine based on driver inputs and/or other inputs. The ECM also controls various engine parameters to warm the catalyst when the catalyst temperature is less than the light-off temperature. For example only, the ECM may retard the spark timing to provide hydrocarbons in the exhaust gas. Oxidation of hydrocarbons in the exhaust system produces heat, which warms the catalyst.

The amount of heat produced via hydrocarbon oxidation is limited by the amount of oxygen in the exhaust system. A secondary air pump may be mechanically coupled to a cylinder head to provide air directly to the cylinder head. The air delivered by the secondary air pump increases the amount of oxygen in the exhaust system and, therefore, the secondary air pump increases hydrocarbon oxidation capability. The ECM may control operation of the secondary air pump to control oxidation of hydrocarbons in the exhaust system and warm the catalyst.

SUMMARY

A control system for an engine having N cylinders in first and second banks includes a catalyst heat module and a fuel control module. N is an integer greater than two. The catalyst heat module selectively operates the engine in a catalyst heat mode to heat a catalyst. The fuel control module, throughout a fuel injection sequence for each of the N cylinders, adjusts a first air/fuel (A/F) ratio for the first bank to a rich value and adjusts a second A/F ratio for the second bank to a lean value.

A method for an engine having N cylinders in first and second banks includes selectively operating the engine in a catalyst heat mode to heat a catalyst, and throughout a fuel injection sequence for each of the N cylinders, adjusting a first air/fuel (A/F) ratio for the first bank to a rich value and adjusting a second A/F ratio for the second bank to a lean value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
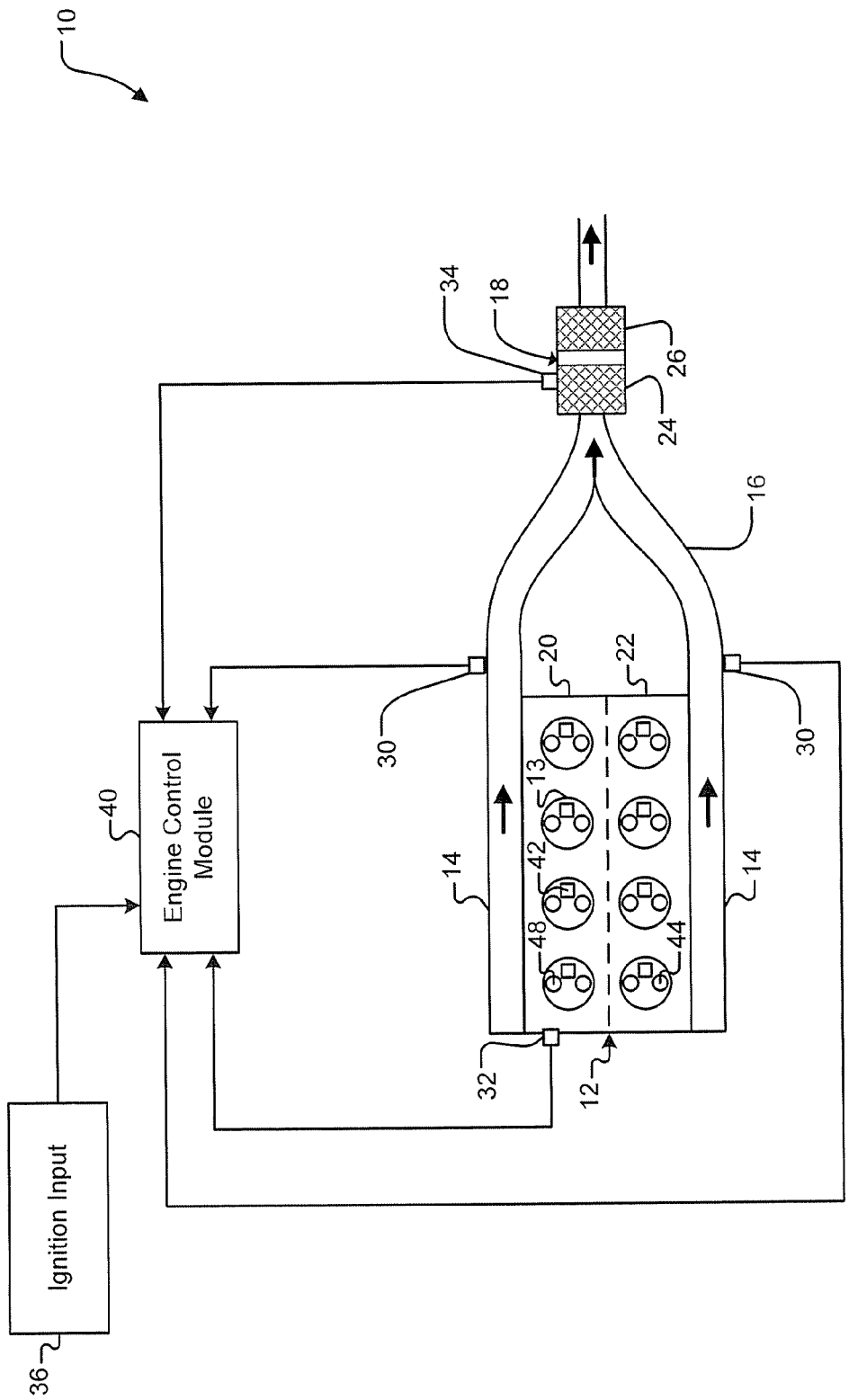
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A fuel control system and method of the present disclosure may operate an engine in a catalyst heat mode to heat a catalyst. In the catalyst heat mode, an air/fuel (A/F) ratio of one cylinder bank is adjusted to lean while an A/F ratio of another cylinder bank is adjusted to rich. Excess carbon monoxide (CO) from the rich bank reacts with excess oxygen ($O_2$) from the lean bank before entering the catalyst to create an exothermic reaction in the catalyst.

A fuel control system and method of the present disclosure may initiate the catalyst heat mode during a cold start of the engine. The catalyst heat mode may be terminated when the catalyst temperature is greater than or equal to a light-off temperature. In this manner, an exothermic reaction may be created in the catalyst during a cold start to increase the catalyst temperature to the light-off temperature without using a secondary air pump.

Referring now to FIG. 1, an engine system 10 includes an engine 12 that may be a port injection engine or a direct injection engine. The engine 12 may include a plurality of cylinders 13, such as, for example, 2, 4, 6, 8, 10 and 12 cylinders. An exhaust manifold 14 is connected to the engine 12 and directs exhaust gas from the engine 12 through an exhaust pipe 16 to a three-way catalyst (TWC) 18 that may be electrically-heated.

The cylinders 13 in the engine 12 may be distributed between a first bank 20 and a second bank 22. The TWC 18 may include an upstream catalyst 24 and a downstream catalyst 26. The upstream catalyst 24 includes catalyst materials suitable for reducing $NO_x$. The downstream catalyst 26 includes catalyst materials that stimulate oxidation of HC and CO molecules.

Oxygen sensors 30 at exits of the exhaust manifold 14 measure oxygen levels in the exhaust gas. An engine coolant temperature (ECT) sensor 32 at the engine 12 measures an engine coolant temperature. A catalyst temperature sensor 34 at the TWC 18 measures a catalyst temperature. An ignition input 36, such as an ignition key or button, generates a start signal.

An engine control module (ECM) 40 starts the engine 12 based on the start signal. The ECM 40 receives the oxygen levels, the engine coolant temperature, and the catalyst temperature. The ECM 40 determines air/fuel (A/F) ratios for the first and second banks 20, 22 based on the oxygen levels. The ECM 40 actuates fuel injectors 42 to inject fuel into the cylinders 13 based on the A/F ratios. Air enters the cylinders 13 through an intake valve 44. The fuel and air combine to form an air/fuel mixture that combusts within the cylinders 13. Exhaust gas exits the cylinders 13 through an exhaust valve 48.

The ECM 40 operates the engine system 10 in a catalyst heat mode during a cold start of the engine 12. In the catalyst heat mode, the ECM 40 adjusts the A/F ratio of the first bank 20 to rich and simultaneously adjusts the A/F ratio of the second bank 22 to lean. A rich A/F ratio is greater than a stoichiometric ratio and a lean A/F ratio is less than a stoichiometric ratio.

Figure 2:
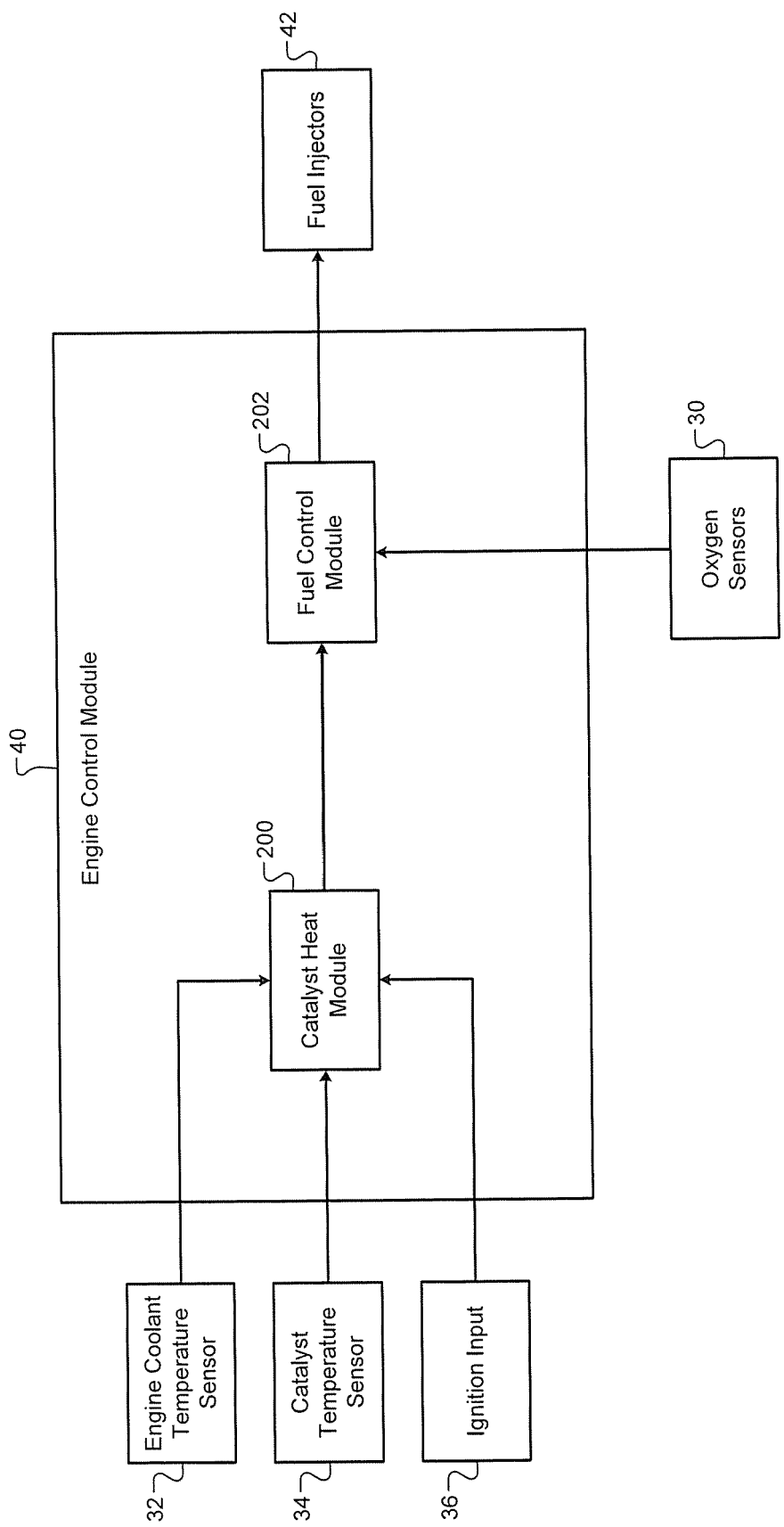
FIG. 2 is a functional block diagram of an exemplary engine control module according to the principles of the present disclosure.

Referring now to FIG. 2, the ECM 40 may include a catalyst heat module 200 and a fuel control module 202. The catalyst heat module 200 receives the engine coolant temperature from the ECT sensor 32, the catalyst temperature from the catalyst temperature sensor 34, and the start signal from the ignition input. The catalyst heat module 200 may generate a catalyst heat signal to operate an engine in a catalyst heat mode, thereby heating a catalyst.

The catalyst heat module 200 may initiate the catalyst heat mode during a cold start of the engine. The catalyst heat module 200 may determine that the cold start occurs when the engine is started and when the engine coolant temperature is less than an operating temperature. The catalyst heat module 200 may determine that the engine is started when the start signal provides direction to start the engine.

The catalyst heat module 200 may terminate the catalyst heat mode when the catalyst temperature is greater than or equal to a light-off temperature. The catalyst heat module 200 may terminate the catalyst heat mode when the engine coolant temperature is greater than or equal to the operating temperature. For example only, the operating temperature may be approximately 95° C.

The fuel control module 202 controls the fuel injectors 42 to adjust A/F ratios of cylinders based on the catalyst heat signal received from the catalyst heat module 200. The fuel control module 202 adjusts a first air/fuel (A/F) ratio to rich and adjusts a second A/F ratio to lean when the catalyst heat signal provides direction to operate the engine in the catalyst heat mode.

The first and second A/F ratios may be associated with first and second cylinders, respectively. Alternatively, the first and second A/F ratios may be associated with first and second banks cylinder banks, respectively. The second cylinder bank may be closer to the catalyst than the first cylinder bank.

Rich and lean A/F ratios may vary based on a fuel injection system type. For port injection systems, a lean A/F ratio may be 11.5 and a rich A/F ratio may be approximately 16. For direct injection systems, a lean A/F ratio may be approximately 13 and a rich A/F ratio may be approximately 16.

Figure 3:
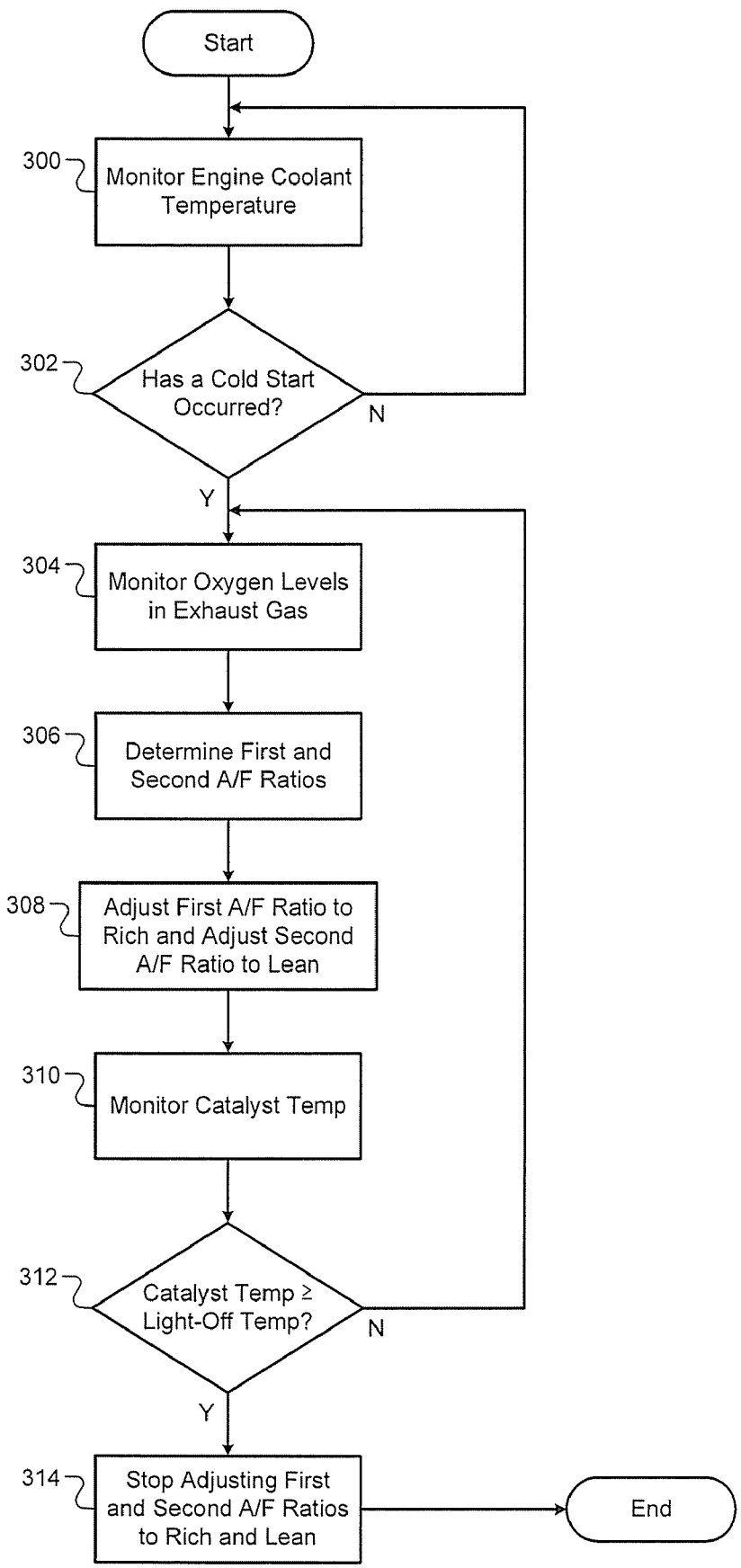
FIG. 3 is a flowchart depicting exemplary steps of a control method according to the principles of the present disclosure.

Referring now to FIG. 3, control monitors an engine control temperature in step 300. Control determines whether a cold start of an engine has occurred in step 302. Control may determine that the cold start occurs when the engine is started and the engine coolant temperature is less than an operating temperature.

Control returns to step 300 when the cold start has not occurred. Control monitors oxygen levels in exhaust gas exiting cylinders in step 304 when the cold start has occurred. Control determines first and second air/fuel (A/F) ratios of the cylinders based on the oxygen levels in step 306.

Control adjusts the first A/F ratio to rich and simultaneously adjusts the second A/F ratio to lean in step 308. This creates an exothermic reaction that heats a catalyst. Control may adjust an amount of fuel injected into first and second cylinders to adjust the first and second A/F ratios, respectively. Alternatively, control may adjust an amount of fuel injected into first and second banks of cylinders to adjust the first and second A/F ratios, respectively.

Control monitors a catalyst temperature in step 310. Control determines whether the catalyst temperature is greater than or equal to a light-off temperature in step 312. Control returns to step 304 when the catalyst temperature is less than the light-off temperature. Control stops adjusting the first A/F ratio to rich and the second A/F ratio to lean in step 314 when the catalyst temperature is greater than or equal to the light-off temperature.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine having N cylinders in first and second banks, wherein N is an integer greater than two, comprising:
a catalyst heat module that, based on an engine coolant temperature, selectively operates the engine in a catalyst heat mode to heat a catalyst; and
a fuel control module that, throughout a fuel injection sequence for each of the N cylinders, adjusts a first air/fuel (A/F) ratio for the first bank to a rich value and adjusts a second A/F ratio for the second bank to a lean value.

2. The control system of claim 1, wherein a first distance between the first bank and the catalyst is greater than a second distance between the second bank and the catalyst.

3. The control system of claim 1, wherein the fuel control module determines the first A/F ratio based on a first oxygen level in exhaust gas from the first bank and determines the second A/F ratio based on a second oxygen level in exhaust gas from the second bank.

4. The control system of claim 1, wherein the fuel control module adjusts the first A/F ratio by controlling a first amount of fuel injected into the first bank and adjusts the second A/F ratio by controlling a second amount of fuel injected into the second bank.

5. The control system of claim 1, wherein the catalyst heat module initiates the catalyst heat mode during a cold start of the engine.

6. The control system of claim 5, wherein the cold start occurs when the engine is started and the engine coolant temperature is less than an operating temperature.

7. The control system of claim 5, wherein the catalyst heat module terminates the catalyst heat mode when a catalyst temperature is greater than or equal to a light-off temperature.

8. The control system of claim 1, wherein the catalyst is at least one of an electrically-heated catalyst and a three-way catalyst.

9. The control system of claim 1, wherein the lean value is equal to approximately 11.5 and the rich value is equal to approximately 16.

10. The control system of claim 1, wherein the lean value is equal to approximately 13 and the rich value is equal to approximately 16.

11. A method for an engine having N cylinders in first and second banks, wherein N is an integer greater than two, comprising:
selectively operating the engine in a catalyst heat mode to heat a catalyst based on an engine coolant temperature; and
throughout a fuel injection sequence for each of the N cylinders, adjusting a first air/fuel (A/F) ratio for the first bank to a rich value and adjusting a second A/F ratio for the second bank to a lean value.

12. The method of claim 11, wherein a first distance between the first bank and the catalyst is greater than a second distance between the second bank and the catalyst.

13. The method of claim 11, further comprising determining the first A/F ratio based on a first oxygen level in exhaust gas from the first bank and determining the second A/F ratio based on a second oxygen level in exhaust gas from the second bank.

14. The method of claim 11, further comprising adjusting the first A/F ratio by controlling a first amount of fuel injected into the first bank and adjusting the second A/F ratio by controlling a second amount of fuel injected into the second bank.

15. The method of claim 11, further comprising initiating the catalyst heat mode during a cold start of the engine.

16. The method of claim 15, wherein the cold start occurs when the engine is started and the engine coolant temperature is less than an operating temperature.

17. The method of claim 15, further comprising terminating the catalyst heat mode when a catalyst temperature is greater than or equal to a light-off temperature.

18. The method of claim 11, wherein the catalyst is at least one of an electrically-heated catalyst and a three-way catalyst.

19. The method of claim 11, wherein the lean value is equal to approximately 11.5 and the rich value is equal to approximately 16.

20. The method of claim 11, wherein the lean value is equal to approximately 13 and the rich value is equal to approximately 16.

* * * * *